United States Patent [19]

Sharp et al.

[11] Patent Number: 4,562,559
[45] Date of Patent: Dec. 31, 1985

[54] BOREHOLE ACOUSTIC TELEMETRY SYSTEM WITH PHASE SHIFTED SIGNAL

[75] Inventors: H. Eugene Sharp, Missouri City; Miles A. Smither, Houston, both of Tex.

[73] Assignee: NL Sperry Sun, Inc., Stafford, Tex.

[21] Appl. No.: 510,532

[22] Filed: Oct. 17, 1983

Related U.S. Application Data

[63] Continuation of Ser. No. 226,570, Jan. 19, 1981, abandoned.

[51] Int. Cl.$^4$ .............................................. G01V 1/40
[52] U.S. Cl. .......................................... 367/82; 175/40
[58] Field of Search .......................... 175/40; 340/853; 367/81, 82; 375/55, 57, 67; 181/103

[56] References Cited

U.S. PATENT DOCUMENTS 3,889,228 6/1975 Shawhan .............................. 367/82
4,215,427 7/1980 Waggener et al. .................... 367/83

OTHER PUBLICATIONS

Barnes and Kirkwood, "Passbands for Acoustic Transmission in an Idealized Drill String", Journal of the Acoustical Society of America, vol. 51, No. 5, (Part 2), (1972), pp. 1606–1608.

Primary Examiner—Thomas H. Tarcza
Assistant Examiner—K. R. Kaiser
Attorney, Agent, or Firm—Carl O. McClenny; William E. Johnson, Jr.

[57] ABSTRACT

In a borehole telemetry system for acoustically transmitting data over a pipe suspended in a borehole, the level of noise in the data stream is inherently high due to the environment existing in a drilling operation and to the physical characteristics of a drill string. It has been discovered that certain discrete frequency passbands exist in a drill string which permit transmission of an acoustic signal with a minimum level of attenuation. In addition, it is now known that a fine structure exists within these frequency passbands which presents gaps or voids that attenuate the signal at a much higher rate. These gaps are on the order of 20 Hz.

By generating an acoustic signal at a precise frequency spectrum within these passbands and then phase shifting the signal before its transmission, the energy spectrum of the transmitted signal is spread out over a sufficient frequency range to bridge these gaps.

5 Claims, 8 Drawing Figures

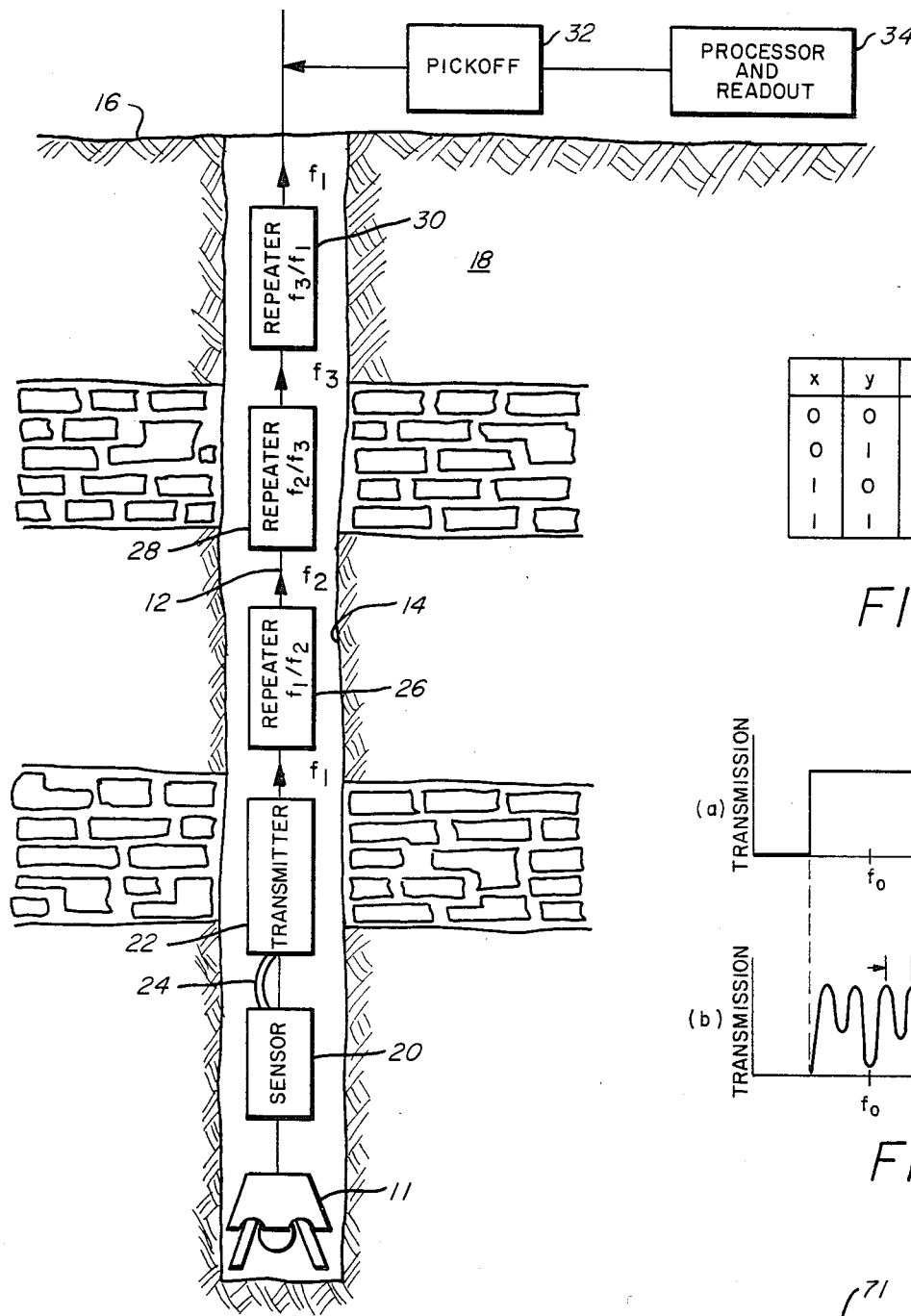
FIG. 1
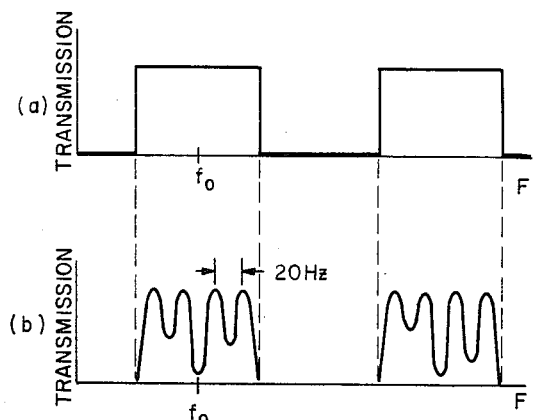
FIG. 7
FIG. 8
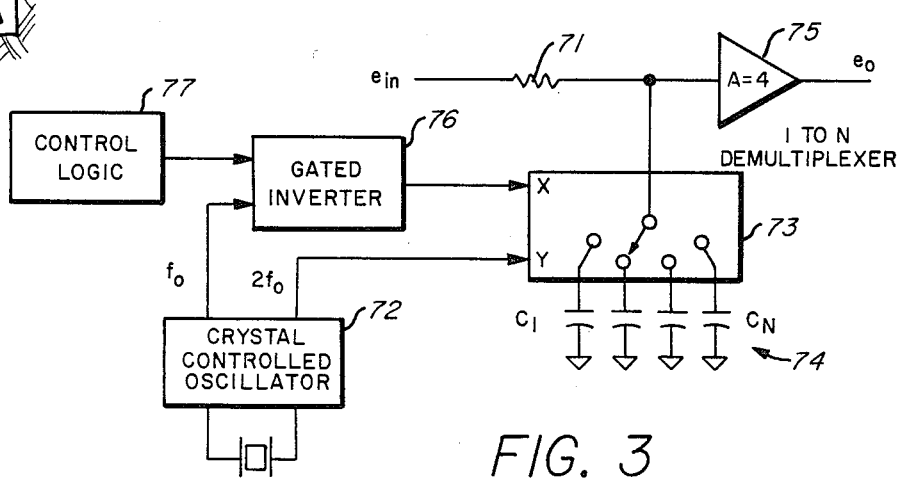
FIG. 3

BOREHOLE ACOUSTIC TELEMETRY SYSTEM WITH PHASE SHIFTED SIGNAL

This is a continuation of application Ser. No. 226,570 filed on Jan. 19, 1981, and now abandoned.

BACKGROUND OF THE INVENTION

This invention relates to acoustic telemetry in a borehole and more particularly to acoustically transmitting data over a pipe suspended in a borehole using a precise frequency spectrum for such transmission. The problem of borehole telemetry has prevailed in the petroleum industry for a number of years. This problem has become increasingly crucial with the advent of deeper drilling, increased activity offshore, and rapidly escalating costs of drilling, all of which have brought about the requirements for drilling safer and less expensively. The acquisition of real time data from the bottom of a wellbore and in particular data associated with the parametric conditions of a drill bit offers the greatest potential for utilizing such a system. Recent increased attention to our energy needs has brought about the need for deeper drilling as well as increased activity in higher cost offshore and hostile environments. Basic drilling costs have escalated 150% in the last decade. These energy needs and escalating costs have focused attention on all potential methods to drill safer and cheaper. Of the possible methods, real time data from the drill bit offers the greatest potential to improved drilling efficiency and effectiveness in both exploration and production wells. The search for a reliable and economical method of obtaining information from the vicinity of the bit, while drilling, has been a goal ever since the advent of rotary drilling. Except in very special circumstances, however, previous attempts to develop real time measure-while-drilling (MWD) systems have not met with success. Current technology is limited to surface evidence of drilling effectiveness. For example, measurements are presently made during drilling which include rotation rate, penetration rate, torque, etc. Also measured at the surface are the properties of the drilling fluid; i.e., weight, viscosity, etc. Systems are available to take the surface measurements and convert the information from analog to digital form, then process and display the parameters along with information inferred from them. Where experience is sufficient, these measurements may be used successfully in predicting problems such as abnormal formation pressure before a well control problem occurs. Lithology can also be inferred from certain types of measurements. However, the limitation remains that only surface information is available to infer conditions which may be far beneath the earth's surface.

Directional surveys of a borehole can be made presently by means of pump down or wireline tools. Here again, this is an after-the-fact measurement which requires significant interruption of the drilling process. Presently in commercial use are mud pulse systems for telemetering data from the bit vicinity to the surface, however, these systems are limited in their capability and application and as yet require the cessation of drilling.

There are basically four types of systems which show promise as communication and transmission techniques in a borehole telemetry system. These are mud pressure pulses, electromagnetic methods, insulated conductor or hardwire systems, and acoustic methods. Each of these systems has its advantages and disadvantages. The present application is concerned with an acoustical technique for transmitting signals through the drill pipe. This system offers a high degree of reliability together with a rapid data rate, and the potential of low development and production costs. The greatest obstacle to the development of such a system has been the very low intensity of the signal which can be generated downhole, along with the acoustic noise generated by the drilling system resulting in a high ratio of noise to signal. In order to overcome these problems, work has proceeded in the development of a system utilizing repeaters in the drill pipe string to help alleviate the signal attenuation problem. As the development of this system proceeds, it is apparent that the use of discrete frequencies falling into particular bandwidths is essential for the successful transmission of acoustic data on a drill pipe. Accordingly, every means possible must be utilized in order to increase the efficiency of such a system to realize successful data transmission.

A breakthrough in the development of such a telemetry system has been a recent identification of frequency passbands in a drill string. A discussion of the history of this discovery is set forth in U.S. Pat. No. 4,293,936. Further development of a system utilizing precise frequencies within specific passbands has uncovered the existence of a fine structure within these passbands. Such fine structure is in the nature of a comb with transmission voids or gaps occurring between teeth representing transmission bands, both within the overall passbands. This fine structure appears to repeat itself, within passbands of the same frequency range, for a given drill string and a given drilling situation. On the other hand, it is believed that the fine structure exists as a result of physical variables in a drill string and its associated environment. Such factors as small differences in pipe length, condition of tool joints, the position of swivels and support structure, etc., all appear to contribute to the makeup of the fine structure within the passbands. It is essential that a single telemetry system be developed which can be used as these physical parameters change either during a drilling operation or in different drilling operations. For example, if a transmission frequency $f_0$ were chosen which, due to the fine structure, were to fall within one of the gaps in the fine structure, the transmitted signal might be attenuated beyond recovery, even though the $f_0$ were to fall in the center of a known passband.

It is therefore an object of the present invention to provide a new and improved acoustic telemetry system having a capability to operate over a sufficient frequency spectrum to avoid the attenuation of signals occurring within the fine structure of drill string acoustic passbands.

SUMMARY OF THE INVENTION

With this and other objects in view, the present invention contemplates an acoustic telemetry system for use in a borehole environment and utilizing a phase shift in the transmission of a specific frequency within a drill string passband to broaden the frequency spectrum and thereby bridge transmission gaps existing within a fine structure of drill string passbands. A precise frequency falling within a passband is generated and then phase shifted before transmission. Receiving equipment is arranged to provide a control signal to correlate the precise instant of phase shift within the transmitter to that of the received signal to accommodate the signal change within the receiver and thereby maintain a continuity of data transmission.

DETAILED DESCRIPTION OF THE DRAWINGS

FIG. 1 is a schematic diagram of an acoustical telemetry system for use in boreholes;

FIG. 3 is a more detailed schematic diagram of the commutative filter shown in FIG. 2;

FIG. 7 is a diagrammatic representation of the phase shift logic as applied to the commutative filter of FIG. 3; and FIG. 8 is a diagrammatic representation of a drill string passband showing the occurrence of a fine structure in the passband.

DESCRIPTION OF THE PREFERRED EMBODIMENTS

Figure 2:
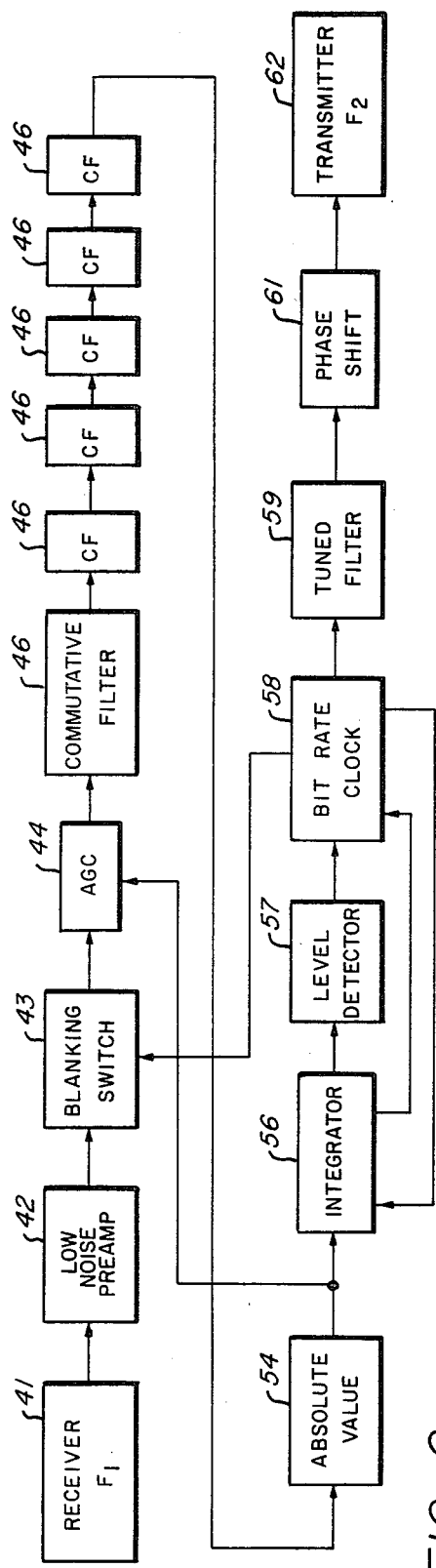
FIG. 2 is a schematic diagram of a receiving/transmitting circuit for use in the telemetry system of FIG. 1.

The invention may be embodied in a borehole telemetry system as illustrated in FIG. 1. As schematically shown, the telemetry system is incorporated into a conventional drilling apparatus that includes a drill bit 11 in a drill stem 12 which are used to drill a borehole 14 from the surface 16 through earth formations 18. Information concerning parameters in a borehole is often desirable during drilling to plan further progression of the hole. This can be derived from sensor 20 or similar device, in the drill string. Sensor 20 can, for example, be an orientation sensing device that provides information necessary for directional drilling. This type device would normally be placed in the drill string very near the drill bit 11.

Information generated by the sensor 20 is usually sent to the surface 16 where it is evaluated and utilized. One transmission system useful for such purposes is an acoustic telemetry system that uses the drill string 12 as a transmission medium. The information is sent along the drill string 12 by an acoustical transmitter 22 which receives the information from nearby sensor 20 through an electrical conductor 24 or by other suitable means and methods of transmission.

The information is then encoded into an intelligible form that is compatible with a particular form of transmission chosen. Acoustical waves suffer attenuation with increasing distance from their source at a rate dependent upon the composition characteristics of the transmission medium. Many boreholes are so deep that signals sent by transmitter 22 will not reach the surface before they are attenuated to a level at which they are indistinguishable from acoustic noise present in the drill string. This problem is discussed in greater detail in U.S. Pat. No. 4,293,936.

In order that the signals reach the surface, they may have to be amplified several times. However, since acoustic waves travel in both directions along the drill string, some method is desirable that will ensure that the signals are received in only one direction. Otherwise, an amplifier would amplify signals coming from both above and below itself, rendering the system ineffective. One method that has been found suitable for producing directional isolation uses frequency shifts among three or more frequencies. Transmitter 22 starts the transmission process by transmitting the signal at a frequency $f_1$. A repeater 26 capable of receiving frequency $f_1$ is positioned in the drill string above transmitter 22. Repeater 26 retransmits the signal at frequency $f_2$ instead of frequency $f_1$.

The signal at frequency $f_2$ is sent along drill string 12 and is received by receiver 28 which is tuned to receive the signal at frequency $f_2$. Repeater 28 then transforms its signal to a frequency $f_3$ and retransmits it. The signal of frequency $f_3$ travels in both directions along the drill string 12, but it can be received only by repeater 30 which receives at $f_3$ and retransmits at $f_1$. The signal cannot be received by repeater 26 since it will receive only $f_1$. In this manner, directionality is assured using three frequencies if alternate repeaters are further apart than the distance necessary for the signal to attenuate to an undetectable level.

A sufficient number of repeaters to transmit the signal to the surface is used, repeating the sequence established by repeaters 26, 28, and 30 until the surface is reached. In FIG. 1, three repeaters are shown although a larger or smaller number may be used. In the system of FIG. 1, repeater 30 performs the final transmission to the surface at $f_1$. At the surface a pickoff 32, which includes a receiver similar to that used in the repeaters, detects the signal in the drill string 12. The pickoff sends the signal to a processor and readout device 34 which decodes the signal and places it in a usable form. Simplistically each repeater comprises a receiver, a transmitter, and a disable network. (This will be described in greater detail with respect to FIG. 2.) It should be recognized that while the basic component comprises a repeater, the transmitter portion may be used separately and in substantially the same configuration as the transmitter of the repeater. In addition, the receiver portion of a repeater may similarly be used as a pickoff. Although the repeater such as 26 which is shown in greater detail in FIG. 2 is utilized for explanatory purposes, its operation and construction is the same as that for repeaters 28 and 30 with changes only to alter the receive and transmit frequencies. Referring to repeater 26 for illustrative purposes, a receiver portion receives the signal at $f_1$ and reconstructs the original wave form, compensating for losses and distortion occurring during transmission through the drill pipe. Reception can be accomplished, for example, by means of a transducer such as a magnetostrictive or electrostrictive device. The reconstructed signal then enters a transmitter portion of the repeater where it is again applied to a transducer which may be the same or of a similar type as that of the receiver. In order to prevent chatter which is analogous to oscillations in an analog network, the transmitter portion is operated only during times that the receiver is not passing its received signal into the repeater circuit. As will be discussed in more detail in connection with FIG. 2, operation of the transmitter portion actuates a blanking switch which prevents the receiver portion from receiving the signal while the transmitting portion is transmitting.

The operation of a telemetry system as shown schematically in FIG. 1 is basically as follows: The sensor 20 develops an analog signal which is converted to a digital coding by means of an appropriate analog to digital conversion system. An example of a sensor to detect directional orientation of a drill bit is shown in U.S. Pat. No. 3,935,642. The signal may also be generated as pulse width data, or the like, which can also be converted to digital data for transmission in the system to be described. The sensor developed signal, in any event, is passed into an analog to digital code utilizing "1" and "0" for information transmission. This information is further processed or coded to permit data to be passed in the form of bits represented by "1's." Such "1's" are transmitted as sound pulses into the pipe. Systems for coding sound pulses for borehole telemetry in a similar manner are set forth in U.S. Pat. Nos. 3,930,220 and 4,293,936. An oscillator is then operated at a fixed frequency and passes its output into a sound source. The sound source then converts the electrical energy into acoustical energy which is imparted in the pipe 12. By use of crystal controlled oscillators, the passage of data bits between alternate receivers and transmitters may be clocked in a precise manner. The system preferably activates the sound source only when a one data bit is passed, thus minimizing the use of power to drive the sound source. Power would then be used continuously only to operate clocking mechanisms and other lower power consumption devices in the instrument.

After the acoustic signal is placed on the pipe string 12, it produces a compressional wave which travels in both directions on the pipe. The repeaters 26, 28, and 30 in the pipe string are spaced to receive the acoustic signal while it is strong enough to be readily detected, thus the system of repeaters function to detect "1's" and then retransmit a signal at a different frequency when activated by the acoustic signal which is indicative of a "1." More specifically, the repeater 26 includes an acoustical transducer or receiver coupled to the pipe which picks up the signal transmitted in the pipe at some discrete frequency; for example, X Hz. The transducer then converts the acoustic signal into an electrical signal which contains the transmitted frequency and any noise on the drill pipe. This signal is then fed to a system such as shown in FIG. 2 which filters the signal, reconditions it, and retransmits it at a different frequency; for example, $X+\Delta X$ Hz to the next uphole repeater, if the signal transmission is taking place in an uphole direction. It is here noted that this system may be utilized to transmit information from the surface to a downhole portion of the apparatus in order to control downhole functions from the surface.

Additional repeater sections 28 and 30 are utilized in the system depending on depth. If the depth of drilling, age of pipe, etc., dictates a system utilizing more than one repeater section, subsequent sections may be operated at other discrete frequencies as, for example, $X+\Delta X$ Hz and $X+2\Delta X$ Hz, alternating between the various frequencies. If sufficient spacing is allowed before repeating a transmitted frequency, natural attenuation of the signal will prevent stray signals from same frequency stations from being interpreted as current data signals. In this respect, it may not be necessary to retransmit from repeater sections at a different frequency, thus a single frequency may be utilized throughout the system. In any event, distance between repeaters and specific frequencies will be determined by signal loss and receiver signal lock on capability.

The repeated signal is again placed on the pipe string by a sound source as an acoustic signal which travels on the pipe to the next adjacent repeater section and eventually to a surface acoustic transducer or pickoff 32. Here the signal is amplified and converted from an acoustical signal into an electrical signal and the data is reconstructed to represent the detected downhole parameter.

Referring next to FIG. 2 of the drawings, a schematic diagram sets forth the components of a repeater section such as at 26, 28, and 30 of FIG. 1. The repeater includes a receiver section 41 comprised of an acoustic transducer for receiving an acoustic signal from the drill pipe and, by means of the transducer, converting it into an electrical signal. The received signal may be embedded in a high noise background. The transducer signal is passed to a low noise preamplifier 42 which, due to the low signal strength, is designed to provide as little circuit noise as possible. Preamp 42 has a high gain with its output being passed through a blanking switch 43 into AGC (Automatic Gain Control) circuit 44. The function of the blanking switch is to prevent the passage od signals into the circuit when a signal is being transmitted by the repeater.

The AGC circuit 44 is arranged to pass its output signal into a commutative filter section 46 comprised of six stages of commutative filters which are designed to filter out any noise or any signal that is outside the band that is being looked for.

The output of the commutative filters 46 is passed to an absolute value network 54 which takes the eye shaped wave from the output of the filters and inverts the negative portion of the signal. The absolute value circuit 54 provides an output that is the absolute value of whatever input it receives. The output of the absolute value circuit 54 is passed back to the AGC 44 to provide a feedback control to the AGC circuit, that has been filtered. Such feedback loop to the AGC that comes after filtering of the noise provides a gain control to the AGC that is set by a signal having a greater signal-to-noise ratio than would result from controlling the AGC before filtering. The absolute value circuit 54 output is also passed to an integrator circuit 56 which is arranged to integrate during the time that it expects to receive a data bit and, therefore, the output of the integrator is the integrated value of the signal that is received. Since a great deal of filtering has occurred to the signal, the noise is low at this time and, if the integrator does not see a signal, it passes an integrated value of the noise which is low. With this in mind, the output of the integrator passes to a level detector 57 which is a clip circuit that looks for a signal above a certain threshold and outputs a square wave, the width of which depends on the level of the integrator wave.

The output of the level detector 57 passes to a bit rate clock 58 which is terminology applied to a certain section of the circuitry because the primary end function of the section is to regenerate a clock which is representative of the bit rate that is present in the received data stream. One function of the bit rate clock is to provide an all digital implementation for the synchronization circuitry, which is temperature insensitive as compared to an analog free running clock. An analog clock has problems with thermal stability and depends upon the initial tolerance of the components that are used to construct it. Components such as resistors and capacitors which have high thermal stability are very expensive and it therefore becomes uneconomical to provide components in the system that will develop the higher tolerances that are needed in a clock for use in a precision frequency instrument such as this. When a free running clock is used, the data stream must be used to correct a significant portion of the free running clock. In other words, a control signal must be developed from the data stream which is able to shift the frequency of the clock by a significant amount. The problem with this is that a false "3" or a noise burst in the data stream would pull the free running clock off frequency enough that it would cause the system to miss a true data bit coming in at a later time. The bit rate clock includes a local crystal oscillator which operates at substantially the same frequency as the transmitter clock that generated the data stream that is being received. Because the crystal used is a low tolerance, high stability device under changing temperature conditions, the two oscillators will be very close in frequency output and they will stay very close over a long period of time. Therefore, the synchronization circuitry of the bit rate clock has to make relatively small corrections by comparison to an analog clock in order to keep the two clocks fully synchronized at all times. This provides a very fine resolution of the timing and also insures that a false signal or false "1" coming in the data stream will have a very small likelihood of shifting the clocks out of synchronization.

An output of the bit rate clock is fed to the integrator circuit 56 to operate the integrator circuit in synchronization with the received incoming data stream. Since the bit rate clock has a local oscillator that is operated by synchronization with the transmitting oscillator, the bit rate clock knows when a received data bit should be coming in and so it operates the integrator to open a window within the system at a time when it is supposed to be receiving a data bit and then waits to see if a data bit is received or not. Assuming that there is data coming in during that time that the window is open, such data bit will have propogated through all of the filtering and through the level detector and into the bit rate clock. This refined signal then comes into the bit rate clock 58 as an output of the integrator by way of the integrator 56 going high and the level detector 57 detecting such high output of the integrator and sending it as a received "1" to the bit rate clock.

The bit rate clock then determines whether the received pulse has been received early or late, which information is passed back to the integrator 56 to shift the reception window in response to the comparison made by the bit rate clock. The bit rate clock operates to continuously shift the window in very minute time increments so that there is a continuous jittering effect going on between the bit rate clock and the integrator, with the overall effect being that the local receiver clock is fully synchronized to the clock controlling the remote transmitter.

Another portion of the bit rate clock 58 provides a fast search function. The purpose of the fast search is to synchronize the local bit rate clock with the remote transmitter clock, particularly when the system is first powered, so that if the clocks are far out of synchronization it does not take a long period of time for the synchronization to be effected. The fast search mode forces the bit rate clock to search in only one direction if it does not see data for a certain period of time. This pushes the clock in one direction at a relatively fast rate until the two clocks are synchronized. Then when data is being received, the bit rate clock ceases to function in the fast search mode and returns to its normal mode of operation. An input to the bit rate clock directly from the integrator serves to provide this fast search function of the bit rate clock with the information that a valid data signal is being received and that the fast search need not continue to operate.

The bit rate clock is comprised of CMOS circuitry (complementary metal oxide semiconductor) to provide for the low power consumption that is desirable in the operation of borehole tools. The bit rate clock outputs a square wave signal of selected frequency which may be different than that received and which is one of three different frequencies coming from three different output oscillators in the bit rate clock section. This square wave output is passed to a tuned filter 59 which converts the square wave to a sine wave which in turn in passed to a phase shift circuit 61. The phase shift circuit utilizes circuit logic to shift the phase of the signal 180° to form a wider frequency spectrum in the transmitted signal. This phase shifted signal is then passed to the transmitter 62, which is an acoustic transducer, to place the frequency spectrum acoustically upon the drill pipe for transmission to the next receiving repeater or receiver.

Another output of the bit rate clock 58 passes to the blanking switch 43 which operates to interrupt reception of the incoming signal to the remaining circuitry so that when the output of the bit rate clock operates the oscillators for driving the transmitter 62, the resulting high level signal does not saturate the circuit just described. A more detailed description of the bit rate clock and AGC circuits is set forth in U.S. Pat. No. 4,254,481.

Figure 5:
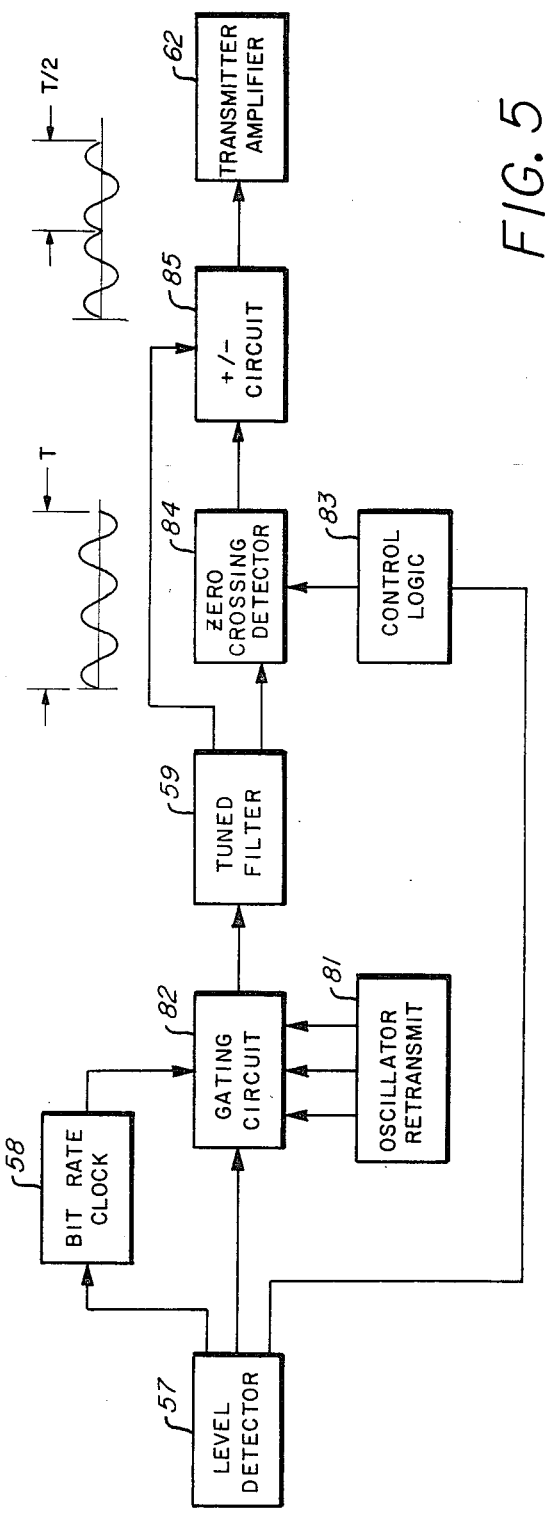
FIG. 5 is a more detailed schematic diagram of the phase shift circuit of FIG. 2.

Referring now to FIG. 5 of the drawings, the signal emerging from bit rate clock 58 is refined and filtered to a level suitable for retransmission. It should be emphasized again at this time that the operation of the signal receiver and transmitter are being described in terms of a repeater and that the transmitter and receiver both may be operated as independent systems. For example, the downhole transmitter 22 (FIG. 1) would not receive a signal from the filter/clock circuits of FIG. 2 but rather from the downhole sensor 20 and associated analog to digital converter circuits. However, the operation of the transmitter itself would be the same for both applications and will be described in only the repeater format to avoid repetition. Thus the signal which passes from the bit rate clock 58 to gating circuit 82 for passing a frequency burst from oscillator 81 might all be replaced by an oscillator outputting the original $f_1$ from the transmitter 22. In any event, the output of tuned filter 59 is a sine wave of a fixed duration T and at a discrete frequency $f_0$. It is at this time that the shape of the frequency spectrum $f_0$ is altered by phase shifting to broaden its frequency distribution to avoid the gaps present in the frequency passbands which are illustrated in FIG. 8 line (b). The so-called drill string passbands which are known to provide better transmission, are illustrated in line (a) of FIG. 8. These passbands have been discovered to include a fine structure including transmission gaps or voids (line b) which vary as a function of frequency even within the previously defined passbands. Although it appears that this fine structure is predictable within a fixed system; i.e., with no changing physical characteristics, such a fixed system is likely not to occur in drilling operations. Therefore, if a discrete transmission frequency $f_0$ is chosen which falls in the middle of a transmission gap, effective transmission might not take place. The present system is arranged to provide a wide spread of the spectral energy of the transmitted frequency.

Previously, the pulse wave form that has been transmitted was in the nature of a sine wave transmitted for time T (ex: 100 milliseconds). This resulted in frequency spectrum such as that shown in FIG. 6 line (b) where the energy is concentrated at the frequency of the sine wave, with some spreading proportional to 1/T, where T is the length of the pulse. For 100 milliseconds, the spectrum might spread in the order of 5 to 10 Hz on either side of $f_0$. It has been found that the notches in the passbands are on the order of 20 Hz apart, and the spectral spread shown in line (b) is not sufficient to insure transmission overlap into a transmission band. The phase shift approach to transmission provides a minimum hardware impact. For example, using a single phase shift of 180° and transmitting for the same time period, you substantially double the frequency spectrum. In the illustrative example, this is accomplished by reversing the phase of the sine wave in the middle of the pulse at T/2 (line a, FIG. 6). The resulting signal is transmitted over its first half at a zero phase reference and at a 180° phase reference for the second half.

Figure 6:
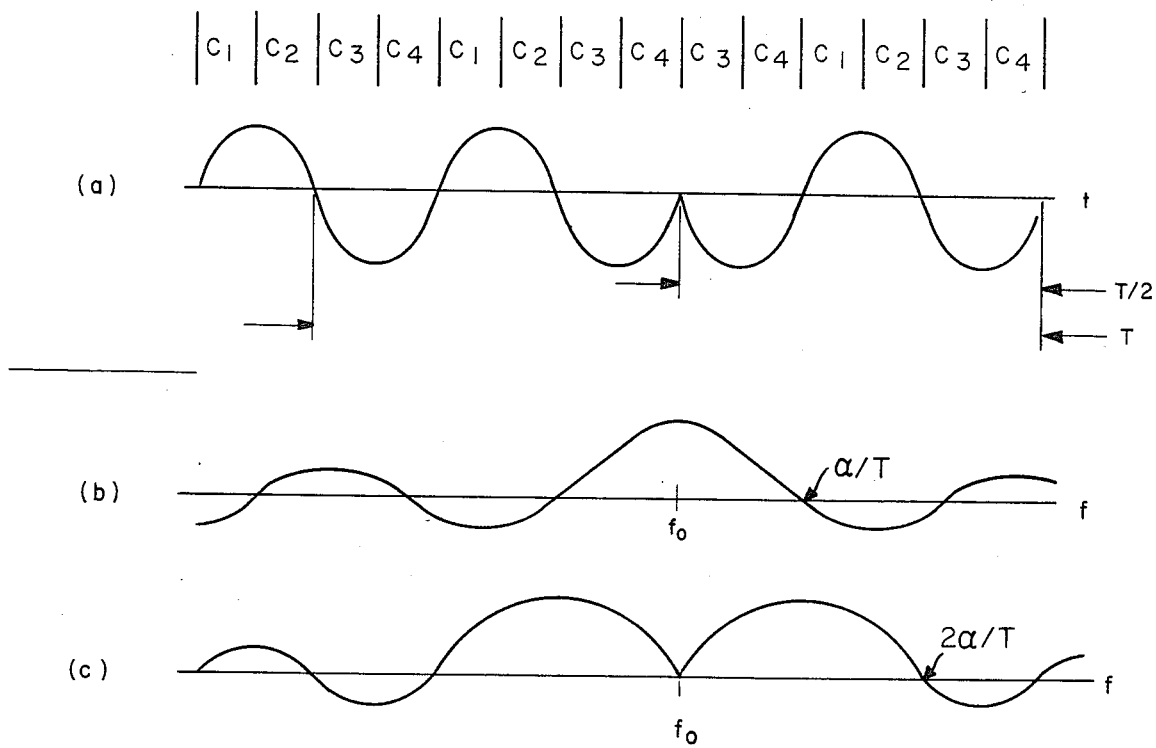
FIG. 6 is a diagrammatic representation of a frequency spectrum in the frequency domain and of the sequencing of the commutative filters to accommodate a phase shifted signal.

Although it turns out that there is actually no energy at the precise transmission frequency $f_0$, the overall spectrum is spread roughly twice as far as the unmodified wave form (line c, FIG. 6). If the unmodified wave form has a spectrum of $\alpha/T$ on either side of $f_0$, the phase shifted wave form spectrum extends to $2\alpha/T$ on either side of the center frequency. Therefore, the system is able to produce an energy spread over a considerably wider range with almost no impact on hardware design. For the 100 millisecond pulse example, an energy speed of ±40 Hz provides sufficient overlap to bridge into one of the transmission regions in the fine structure of the passbands. The pattern of the phase shift may vary, with the phase change being different than 180° and occurring at more than one point in the pulse. The pattern described, however, is particularly simple from a hardware standpoint and effective.

Referring once again to FIG. 5 of the drawings, the circuit implementation of the phase shifting technique described is accomplished as follows: the unmodified sine wave at $f_0$ is passed from tuned filter 59 to a zero crossing detector 84 and to a plus/minus circuit 85. The zero crossing detector is essentially comprised of a comparator and a flip flop circuit. The function of the zero crossing detector is to compare the sine wave with a zero reference.

A logic circuit 83 times the phase shifting. For a 100 millisecond pulse, the control logic times for 50 milliseconds (T/2) and sends a control signal to the zero crossing detector which in turn sends a "1" to the plus/minus circuit 85. The logic circuit times another 50 milliseconds (T/2) and then stops the transmission. The transmitter in a repeater gets its input from level detector 57 to begin the timing function. In a separate transmitter such as transmitter 22 (FIG. 1) the control signal is formed by a functional block which is equivalent to the level detector 57.

The plus/minus circuit is an op-amp amplifier circuit that has been designed such that by applying a digital control to it, the gain of the circuit can be changed to either plus one or minus one. The control signal to the plus/minus circuit is applied in synchronism with the incoming frequency burst from the tuned filter, so that in the middle of the burst T/2, the gain of the plus/minus circuit is changed from a +1 to a -1. Thus the signal from the plus/minus circuit 85 is a frequency burst of T seconds duration with its phase reversed at T/2. The phase reversal needs to occur at an exact zero crossing so that a minimum of disturbance is caused to the sound source, since an instantaneous change in voltage on a sound transducer would be difficult to achieve.

Next referring to FIG. 3 of the drawings, a more detailed schematic representation of the commutative filters is shown. Such filters are particularly useful in the configuration described for providing the stability needed under varying temperature conditions to facilitate the precise and narrow band filtering of this system. An acoustic telemetry system based on amplitude shift keying requires a precise narrow band filter to discriminate between signal and noise. Conventional analog filters such as biquadratic sections can provide the required selectivity but the stability of such filters may not be adequate to meet the demands of borehole temperature extremes. The amplitude shift keyed signal is generated by a crystal controlled oscillator so that the required filter center frequency is precisely known. The present invention makes use of this fact by controlling the center frequency of the commutative filter via a crystal controlled oscillator. The bandwidth, and hence selectivity, is independently controlled by the RC time constant of each stage and the number of stages respectively. The commutative filter accurately and reliably establishes the center frequency of the local receiver filter at the known frequency of the remote transmitter oscillator. This is done to within the tolerance of a crystal controlled oscillator independent of the drift (with temperature) of the passive and active components used in the filter.

Each section of the commutative filter is comprised of a 1 to n demultiplexer 73 which is clocked by a crystal controlled oscillator 72, with one oscillator being used to clock all sections of the commutative filter network. The bandwidth (selectivity) of the filter is determined by the RC time constant including the resistor 71 and the capacitor 74 of the demultiplexer. By setting resistor 71 at an optimum value we set up an RC time constant which allows the filter capacitors to charge to a usable level in as short a time as possible to give adequate averaging characteristics to the RC time constant. An amplifier 75 is provided in each stage to amplify the output signal of the filter. In the first two commutative filter sections of the system disclosed herein, the amplifiers have a gain other than unity and in the last four stages of the commutative filter section the amplifiers are unity gain amplifiers. The gains of the various sections can be other than those chosen for this particular application. As noise is progressively filtered out, the gain is increased without saturating the system with amplified noise. Thus, we can increase the gain as soon as some filtering is done so that we have a higher signal level to work with in the circuit. Then, after the first two stages of filtering, the signal level is high enough to use unity gain thereafter.

Figure 4:
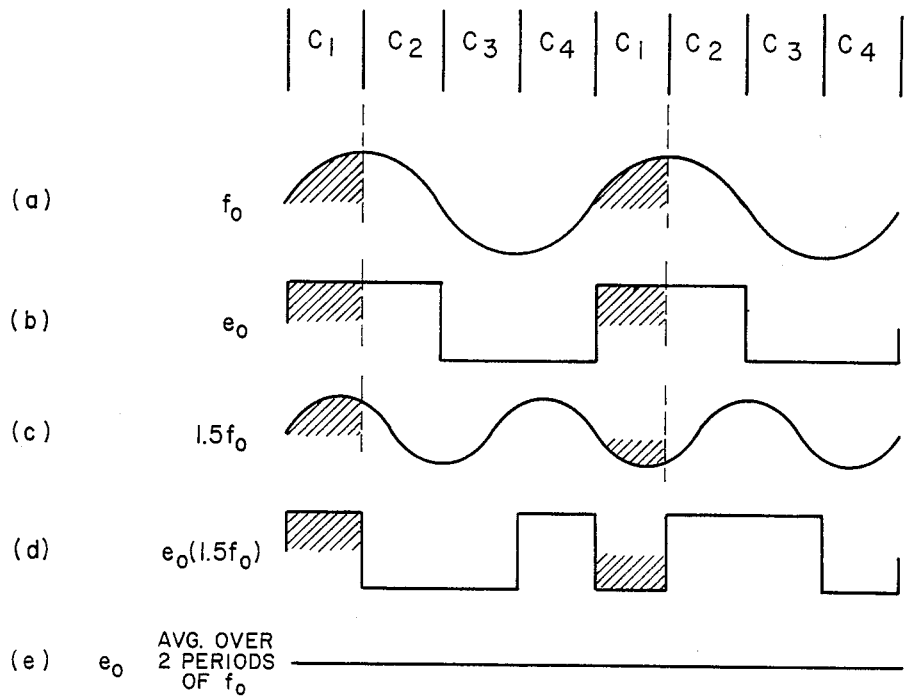
FIG. 4 is a diagrammatic representation of output voltages from the commutative filter of FIG. 3 for selected frequencies.

The crystal controlled oscillator 72 drives the 1 to n demultiplexer commutator through the capacitor contacts from "1" to "n" during each cycle of the received frequency $f_0$. This is graphically demonstrated in FIG. 4 showing the output $e_0$ of the filter for a received frequency of $f_0$, which is the filter response frequency and the frequency of the crystal controlled oscillator. In order to illustrate the filtering technique in a less complicated manner, FIG. 4 shows the commutative filtering of a non-phase reversed sine wave. Later with reference to FIG. 6, the phase shifted signal will be shown and described with respect to the commutative filter system. Referring again to FIG. 4, the dc value of each commutator step is determined by the average value of the input wave form during the time that the commutator contacts each capacitor. The four capacitors in each of the six commutative filter sections are switched in sequence at frequency $f_0$. For a received frequency of $f_0$ with the indicated phase relation, for example, (line a) capacitor $C_1$ will charge to the average value of the upgoing portion of the positive half cycle and capacitor $C_2$ will charge to the average value of the downgoing portion of the positive half cycle. Similarly, capacitor $C_3$ will charge to the average value of the downgoing portion of the negative half cycle and capacitor $C_4$ will charge to the average value of the upgoing portion of the negative half cycle. Line (b) of FIG. 4 illustrates the output voltage corresponding to that portion of the cycle relating to the filter response frequency. When $f_0$ is received, $e_0$ will be the stepped output voltage shown in line (b). Thus, signal (or noise which persists at exactly $f_0$) at frequency $f_0$ passes through the six filter stages with little attenuation and no phase shift.

When the received frequency varies from the filter response frequency $f_0$, the capacitors will charge to an average value of zero. This is demonstrated in lines (c) and (d) of FIG. 4 where it is shown that, for a frequency of 1.5 $f_0$, capacitors $C_1$ and $C_2$ will charge to an average value of zero in two cycles of the basic frequency and likewise for capacitors $C_3$ and $C_4$. For example, observing the shaded areas under the curves in FIG. 4, it is seen that $e_0$ (line b) for $f_0$ (line a) provides an average output for capacitor $C_1$ that is positive in each cycle, thus, the average value of the output of this component $C_1$ is a positive number. In contradistinction by observing lines (c), (d), and (e), it is seen that capacitor $C_1$ charges to an average positive value during its first cycle and to an average negative value of equal magnitude in a second cycle so that $e_0$ averaged over two periods (line e) provides a zero value. Although it is harder to show this zero average value diagramatically for frequencies other than 1.5 $f_0$, the charge on the capacitors will nevertheless average out to zero over some period of time. Attenuation and phase shift of noise, at frequency $f_0 \pm \Delta F$ increases with $\Delta F$. The maximum phase shift in one filter section is $\pm 90°$.

This above described property of commutative filters provides a center frequency that is dependent upon the crystal controlled switching frequency $f_0$ and that is independent of component tolerances or changes thereof due to temperature. In addition, the commutative filter gives control over the filter selectivity (bandwidth) and the filter roll-off rate. These controls are independent of each other and independent of the component changes due to temperature. The filter selectivity is a function of (a) the multiplicity of the capacitors (N), (b) the value of resistor 71, and (c) the value of the capacitor 74. The roll-off rate is a function of the number of filter sections used, with the rate equal to minus 20 decibels per decade per filter section.

The bandwidth of the filter by convention is specified as the 3 db point. The $\Delta F$ of the 3 db point is ($1/2\pi NRC$.) From this it is seen that the bandwidth of the filter response is dependent upon the RC time constant of the filter of FIG. 3, but that the center frequency ($f_0$) is a function of the high stability of the crystal controlled oscillator as opposed to the lesser stability of the capacitors and resistors in response to temperature changes.

Referring now to FIGS. 3 and 6 of the drawings, the operation of the commutative filters receiving a phase shifted signal will be described. A sine wave of a given phase reference is received for the first half of the reception period T and then the signal being received reverses phase by 180°. Therefore, for filtering the first half of the wave form, the commutator is stepped through its addresses exactly the same as in the case of a continuous sine wave; i.e., just cycling through $C_1$, $C_2$, $C_3$, $C_4$, $C_1$, $C_2$, $C_3$, $C_4$, etc. Then in the middle of the wave form at T/2, it is known that a 180° phase reversal will occur. At this time, the control logic to the commutative filter causes the commutator to skip two of the addresses (for a 180° phase change). This is shown diagramatically in line (a) of FIG. 6, where the commutator is shown addressing sequentially through $C_1$, $C_2$, $C_3$, $C_4$ for two cycles and then in the middle of the time period, at T/2, the commutator skips the next $C_1$ and $C_2$ addresses and goes directly to $C_3$, $C_4$, thereafter repeating the sequential addresses $C_1$, $C_2$, $C_3$, $C_4$. When looking at the corresponding wave form as shown at line (a), FIG. 6, it is seen that the portion for example that $C_3$ had been averaging appears out of sequence. Since the addresses are programmed to follow that same "out of sequence" the capacitor $C_3$ continues to physically look at the same geometrical portion of the wave form. Therefore, at the end of the received period, each capacitor has looked at the same portion of the wave form each time during the entire reception and the filtering process operates in exactly the same manner as that described above with reference to FIG. 4 for an unmodified wave form.

The logic implementation of the filtering for a phase shifted signal is now described with reference to FIG. 3 of the drawings.

Two outputs from crystal controlled oscillator 72 are shown providing an $f_0$ and a $2f_0$. The $2f_0$ output is fed to a Y terminal of the 1 to N demultiplexer 73. The $f_0$ output of oscillator 72 is passed through a gated inverter 76 into an X input to the demultiplexer 72. A control logic circuit 77 is arranged to compute the delay of a signal through the filters and associated circuitry and to supply a signal to the inverter 76 at exactly T/2. An expression is developed to provide the amount of delay of the receiver to be taken into account and since the bit rate clock develops information as to the exact middle of the received wave form in its early/late circuitry, these two logic inputs provide the necessary information to control the inverter 76. Therefore, at the computed time that the T/2 point in the signal period arrives at the commutative filter 73, an output from control logic 77 inverts the $f_0$ output of oscillator 72 to the X input of demultiplexer 73.

The logic of this system is diagramatically illustrated in FIG. 7. The normal sequencing of the unmodified wave form through the filter provides $f_0$ and $2f_0$ inputs to demultiplexer 73 as shown in the X and Y columns respectively of FIG. 7. At time T/2 during the signal arrival to the demultiplexer 73 the inverter 76 is actuated to invert the X input and thereby provide a 1/X input as shown in FIG. 7. The logic of the demultiplexer is arranged to address capacitors $C_1$, $C_2$, $C_3$, $C_4$ as the X and Y inputs are sequentially signaled by the 1 and 0 inputs shown in column X/Y of FIG. 7. The signal control logic 77 changes this sequence to that shown in column $X^1$/Y of FIG. 7, causing the demultiplexer to address the capacitors $C_1$, $C_2$ out of their normal sequence to filter the phase shifted wave form as shown in FIG. 6, line (a).

The disclosure above has described this invention in terms of phase shifting a transmitted signal and accommodating such phase shift in a receiver, where the phase shift occurs but once in the signal period T and for 180° of phase. While this format was chosen for its simplicity of implementation in a system already designed to operate with an unmodified signal, other formats can be used which will give an even greater spread of the signal energy over a larger spectrum of frequencies. For example, the signal might be shifted more than once during the signal period T to effect this spread or other phase relations could be developed.

Therefore, while particular embodiments of the present invention have been shown and described, it is apparent that changes and modifications may be made without departing from this invention and it is the aim of the appended claims to cover all such changes and modifications as fall within the true spirit and scope of this invention.

What is claimed is:

1. An acoustic telemetry system for sending acoustic signals over a pipe string suspended in a borehole, comprising:

transmitting and receiving means positioned at spaced apart locations in the pipe string;

acoustic energy frequency generating means for producing a frequency spectrum over a finite period for transmission on the pipe string from one location to another of said locations and within a specific pipe string passband, said passband further having a fine structure presenting transmission gaps within the specific pipe string passband;

means for spreading the frequency spectrum with significant energy over a frequency spectrum of at least 30 Hz to thereby bridge transmission gaps within the fine structure of the pipe string passband; and means for imparting the spread frequency spectrum energy to the pipe string for transmission to the other location.

2. The acoustic telemetry system of claim 1 and further including phase shifting means for changing the phase of the generated frequency spectrum to thereby spread the frequency spectrum.

3. The acoustic telemetry system of claim 2 wherein said phase shifting means includes means for reversing the phase of the frequency by 180° at at least one point during the finite period.

4. An acoustic telemetry system for sending acoustic signals over a drill string suspended in a borehole, comprising:

acoustic transmitting and receiving means positioned at spaced apart locations in the drill string, said transmitting means being arranged to transmit an acoustic signal for a fixed time period;

means for phase shifting said signal at least one known time within said fixed time period;

filter means for sequentially comparing portions of a received signal with the transmitted signal over said fixed time period;

means for shifting the sequence of said sequentially comparing filter means to correlate the operation of said filter means with the phase shift of the transmitted acoustic signal; and a control logic circuit for incorporating a delay of said signal through the receiving means and supplying a signal to the sequence shifting means to affect correlation of the filter means with the phase shift in the received signal.

5. The acoustic telemetry system of claim 4 and further including means deriving a signal from the receiving means which indicates the exact middle of the received signal and passing a signal in response thereto which when modified with respect to the incorporated delay of the received signal, serves to operate the filter means in exact time correlation with the occurrence of the phase shift of the received signal.

* * * * *